US008953758B2

(12) United States Patent
Kumar K.A.

(10) Patent No.: US 8,953,758 B2
(45) Date of Patent: Feb. 10, 2015

(54) TERMINATING A CALL ACCORDING TO REVERSE SIGNALING DATA

(75) Inventor: Pradeep Kumar K.A., Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 287 days.

(21) Appl. No.: 13/427,374

(22) Filed: Mar. 22, 2012

(65) Prior Publication Data
US 2013/0251116 A1 Sep. 26, 2013

(51) Int. Cl.
*H04M 1/64* (2006.01)
*H04M 3/42* (2006.01)

(52) U.S. Cl.
USPC .................................. 379/88.22; 379/211.02

(58) Field of Classification Search
USPC ...................................... 379/211.02
See application file for complete search history.

(56) References Cited

U.S. PATENT DOCUMENTS

| | | | |
|---|---|---|---|
| 7,602,895 B2 * | 10/2009 | Terry et al. | 379/215.01 |
| 8,027,335 B2 * | 9/2011 | Ansari et al. | 370/353 |
| 8,081,737 B2 * | 12/2011 | Kafka | 379/32.01 |
| 2003/0099341 A1 * | 5/2003 | Williams | 379/211.02 |
| 2004/0037410 A1 * | 2/2004 | Roberts et al. | 379/215.01 |
| 2005/0074107 A1 * | 4/2005 | Renner et al. | 379/202.01 |
| 2005/0100145 A1 * | 5/2005 | Spencer et al. | 379/88.22 |
| 2005/0123118 A1 * | 6/2005 | Terry et al. | 379/211.02 |
| 2005/0213740 A1 * | 9/2005 | Williams et al. | 379/211.02 |
| 2006/0193461 A1 | 8/2006 | Gavillet et al. | |
| 2007/0127652 A1 * | 6/2007 | Divine et al. | 379/142.01 |
| 2009/0052639 A1 | 2/2009 | Payne | |
| 2010/0067668 A1 | 3/2010 | Tasker | |
| 2010/0159893 A1 | 6/2010 | Baldwin et al. | |
| 2011/0034151 A1 | 2/2011 | Brouwer et al. | |

OTHER PUBLICATIONS

Avaya, "Avaya Extension to Cellular," User Guide, Avaya Aura™ Communication Manager Release 6.0, Issue 14, Jun. 2010, pp. 1-82.

* cited by examiner

*Primary Examiner* — Joseph T Phan
(74) *Attorney, Agent, or Firm* — Baker Botts L.L.P.

(57) ABSTRACT

An incoming call is communicated to a first endpoint and a second endpoint. A call redirection message comprising a redirection number is received from the first endpoint, and it is determined whether the first endpoint should be disconnected from the call according to the redirection number. The call is disconnected from the first endpoint if the redirection number indicates that the call should be disconnected.

6 Claims, 4 Drawing Sheets

US 8,953,758 B2

TERMINATING A CALL ACCORDING TO REVERSE SIGNALING DATA

TECHNICAL FIELD

The present disclosure relates generally to calls to multiple endpoints, and more particularly to terminating a call to one of a plurality of endpoints according to reverse signaling data.

BACKGROUND

Network endpoints, such as telephones, are often associated with a user. Multiple endpoints may be associated with a user, including both personal and enterprise endpoints. A user may receive business calls on both personal and enterprise endpoints, and a user may receive personal calls on both personal and enterprise endpoints. Often, the first endpoint to redirect a call to voice mail stores a voice message for the call in a voice mailbox associated with the endpoint. However, the voice message may not be associated with the particular voice mailbox that stores the voice message.

BRIEF DESCRIPTION OF THE DRAWINGS

To provide a more complete understanding of the present disclosure and the features and advantages thereof, reference is made to the following description taken in conjunction with the accompanying drawings, in which.

DESCRIPTION OF EXAMPLE EMBODIMENTS

Overview

The teachings of the present disclosure relate to a method comprising communicating an incoming call to a first endpoint and a second endpoint, receiving a call redirection message comprising a redirection number from the first endpoint, determining whether the first endpoint should be disconnected from the call according to the redirection number, and disconnecting the call from the first endpoint if the redirection number indicates that the call should be disconnected.

Description

Figure 1:
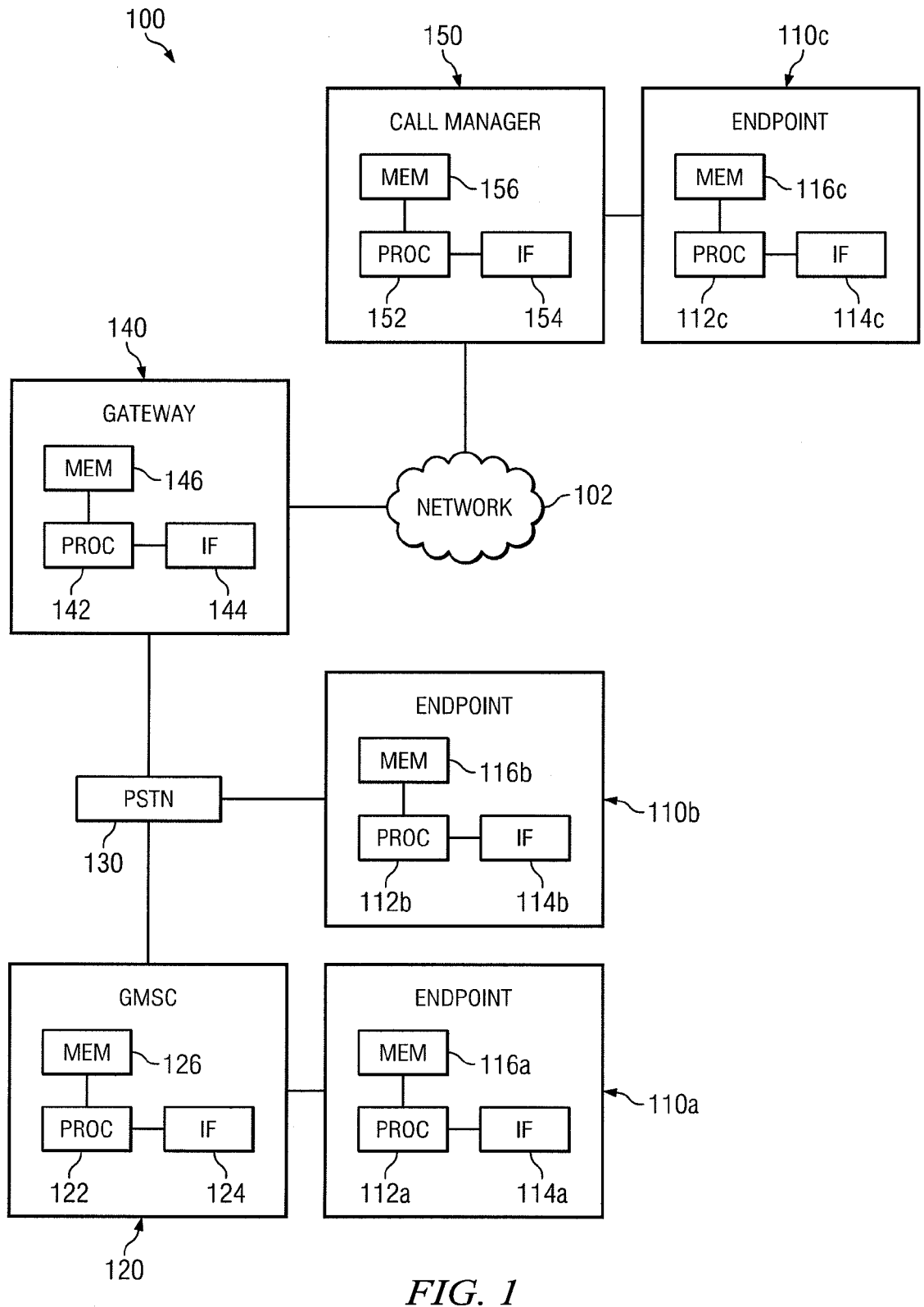
FIG. 1 is a block diagram illustrating an example of a system for terminating a call according to reverse signaling data for the call.

FIG. 1 is a block diagram illustrating an example of a system 100 for terminating a call according to reverse signaling data for the call. System 100 includes network 102, endpoints 110, including mobile endpoints 110a, public switched endpoints 110b, and private network endpoints 110c, gateway mobile switching center (GMSC) 120, public switched telephone network (PSTN) 130, gateway 140, and call manager 150.

Endpoints 110 are often associated with a user. For example, a user may be associated with one or more enterprise endpoints 110 (e.g., endpoint 110c) and/or one or more personal endpoints 110 (e.g., endpoints 110a and 110b). The plurality of endpoints 110 associated with a user may be associated with a single contact number, for example, in single number reach (SNR) systems. In SNR, a call placed to a single contact number may ring concurrently at multiple endpoints 110 until the call is answered by a user at one of the endpoints 110, or by a voicemail system. Often, an endpoint 110 may redirect the incoming call to a voice mail system. For example, a mobile endpoint 110 that is turned off, or that does not have a signal, may automatically redirect an incoming call to a voice mail system.

An enterprise user may employ SNR such that incoming calls associated with an enterprise and directed to the user ring at personal and enterprise endpoints 110, or the user may use SNR to allow personal incoming calls to notify personal and enterprise endpoints 110. For example, a user receives an enterprise call on personal endpoint 110a, and personal, endpoint 110a redirects the incoming call to a voice mail system before the call is connected to enterprise endpoint 110c. Then, a voice mail system associated with personal endpoint 110a stores the voice message even though the call was an enterprise call. In an embodiment, once the voice mail associated with endpoint 110a answers the call, the call stops ringing on endpoint 110c. If the voice mail associated with endpoint 110a answers quickly, the user is unable to answer the call at endpoint 110c. To avoid this outcome, in an embodiment, system 100 detects that the call to a particular endpoint 110 (e.g., a personal endpoint 110) is redirected to the voice mail system and releases the call before it connects to the voice mail system. The call may continue to ring at another endpoint 110 (e.g., an enterprise endpoint 110), and, if not answered, redirected to a voice mailbox associated with enterprise endpoint 110.

In an embodiment of operation, when a call to endpoint 110a or 110b redirects to a voice mail system, GMSC 120 and/or PSTN 130 communicates reverse signaling data (e.g., a redirection number) to call manager 150. Call manager 150 compares the redirection number to the number of the endpoint 110a or 110b originally called and/or a list of approved redirection numbers (e.g., call forwarding numbers previously identified to call manager 150).

In an embodiment, if the reverse signaling data includes the number of the originally called endpoint 110a or 110b, a number designated by a user as an approved call redirection number, or if the redirected number is not present in the reverse signaling data, call manager 150 does not release the call and the call is established to the endpoint 110a, 110b, or other endpoint 110 associated with the redirection number. In the embodiment, in all other cases (e.g., the reverse signaling data contains a number other than the number of the originally called endpoint 110 or a user designated approved call redirection number), call manager 150 releases the call and the call is not established to the endpoint 110 associated with the redirection number (e.g., a voice mail system).

Reverse signaling data (e.g., call redirection numbers) may include any data communicated back to call manager 150 from components involved in setting up a call to an endpoint 110 (e.g., endpoint(s) 110, GMSC 120, PSTN 130, and/or gateway 140). Reverse signaling data may be in any suitable communication protocol, for example, session initiation protocol (SIP) (e.g., 181 response, 3xx response, diversion header, history-info header, or other SIP message), H.323 (e.g., H.225 Alerting, H.225 Connect, or other H.225 messages), media gateway control protocol (MGCP), other proprietary voice over internet protocol (VoIP) (e.g., skinny call control protocol (SCCP)), Q.931, signaling system #7 (SS7), integrated services digital network (ISDN) User Part (ISUP), and/or ISDN primary rate interface (PRI). In an embodiment, where first and second endpoints 110 are on a call, reverse signaling data is communicated via ISUP and/or Q.931 messages if the first endpoint 110 is connected to network 102 via GMSC 120 or PSTN 130. In another embodiment, reverse signaling data is communicated via H.225, MGCP, and/or SCCP messages if the first endpoint is connected to network 102 via a first call manager 150, and the second endpoint is connected to network 102 via a second call manager 150.

Network 102 represents any suitable network operable to facilitate communication between components of system 100, such as network 102, endpoints 110, gateway mobile switching center (GMSC) 120, public switched telephone network (PSTN) 130, gateway 140, and/or call manager 150. Network 102 may include any interconnecting system capable of transmitting audio, video, electrical signals, optical signals, data, messages, or any combination of the preceding. Network 102 may include all or a portion of a PSTN, a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100.

Endpoints 110 represent any devices, or components of devices, operable to communicate and/or receive voice data. Endpoints 110 may comprise any combination of hardware components and/or software or logic encoded in a non-transitory computer readable medium for execution by a processor. In certain embodiments, endpoints 110 include mobile network endpoints 110a, public switched network endpoints 110b, or private network endpoints 110c (e.g., VoIP endpoints 110). Mobile network endpoints 110a may be part of mobile network, and connect to network 102 through GMSC 120. Public switched network endpoints 110b may be part of a public switched network, and connect to network 102 through PSTN 130. Private network endpoints 110c may be part of a private network (e.g., an enterprise network), and connect to network 102 through call manager 150. In particular embodiments, endpoints 110 may include any type of telephone (e.g., mobile phone, wired phone, VoIP phone, wireless phone, software phone), or other device operable to communicate and/or receive voice data.

GMSC 120 represents a telephone exchange that interfaces between mobile endpoints 110c (e.g., mobile communication devices) and PSTN 130 and/or between multiple mobile endpoints 110c. Calls between mobile endpoints 110c and calls between PSTN 130 and mobile endpoints 110c may route through GMSC 120. In certain embodiments, GMSC 120 provides circuit-switched calling, mobility management, and represents a global system for mobile communication (GSM) or code division multiple access (CDMA) services such as voice, data, fax, short message service (SMS), call redirection, and other services. GMSC 120 may communicate with PSTN 130, or other component, using SS7, or other suitable protocol or protocols.

PSTN 130 represents a public switched telephone network. In certain embodiments, PSTN 130 interfaces between GMSC 120 and gateway 140, between public switched endpoints 110b and gateway 140, and/or between multiple public switched endpoints 110b. PSTN 130 may communicate with gateway 140, or other component, using ISDN PRI, or other suitable protocol or protocols.

Gateway 140 allows different sub-networks running different protocols to transfer data. In certain embodiments, gateway 140 interfaces between PSTN 130 and call manager 150. Gateway 140 may be an H.323 gateway, a SIP gateway, or other suitable gateway. Gateway 140 may communicate with call manager 150, or other component, using H.323, SIP, VoIP, MGCP, SCCP, or other suitable communication protocol or protocols.

Call manager 150 includes any combination of hardware, software and/or encoded logic that operates to receive and process calls to facilitate communication among components of system 100. In particular embodiments, call manager 150 may act as a private branch exchange (PBX) by supporting Internet Protocol (IP) PBX functions, such as hold, park, transfer, redirect and/or other high level and low level call management features. In certain embodiments, call manager 150 interfaces between private network endpoints 110c and gateway 140. Call manager 150 may communicate with endpoints 110c, or other component, using SIP, VoIP, H.323, SCCP, or other suitable communication protocol or protocols.

Modifications, additions, or omissions may be made to system 100. System 100 may include more, fewer, or other components. Call manager 150 may determine to terminate a call to any endpoint 110 (e.g., a voice mail system) according to any suitable reverse signaling data. For example, call manager 150 may consider a SIP 181 message, a SIP 3xx message, a SIP diversion header, a SIP history-info header, H.225 alerting, H.225 connect, connected party information, or any other suitable reverse signaling data. Call manager 150 may determine that a call is redirecting to a voice mail system according to any suitable information contained in reverse signaling data.

Any suitable component of system 100 (e.g., endpoints 110, gateway mobile switching center (GMSC) 120, public switched telephone network (PSTN) 130, gateway 140, and call manager 150) may include a processor, interface, logic, memory, and/or other suitable element. A processor represents any computing device, such as processors 112a-c, 122, 142, and 152, configured to control the operation of one or more components of system 100. A processor may comprise one or more processors and may be a programmable logic device, a microcontroller, a microprocessor, any suitable processing device, or any suitable combination of the preceding. A processor includes any hardware and/or software that operates to control and process information received by a component of system 100. In certain embodiments, a processor communicatively couples to other components of system 100, such as an interface (e.g., interfaces 114a-c, 124, 144, and 154), a memory (e.g., memories 116a-c, 126, 146, and 156), or any other suitable component.

An interface represents any component, such as interfaces 114a-c, 124, 144, and 154, operable to receive input, send output, process the input and/or output, and/or perform other suitable operations for a component of system 100. An interface includes any port or connection, real or virtual, including any suitable hardware and/or software, including protocol conversion and data processing capabilities, to communicate through network 102. In certain embodiments, an interface includes a user interface (e.g., physical input, graphical user interface, touchscreen, buttons, switches, transducer, or any other suitable method to receive input from a user).

A memory represents any component, such as memories 116a-c, 126, 146, and 156, operable to store, either permanently or temporarily, data, operational software, or other information for a processor. Memory includes any one or a combination of volatile or non-volatile local or remote devices suitable for storing information. For example, a memory may include random access memory (RAM), read only memory (ROM), magnetic storage devices, optical storage devices, semiconductor storage devices, or any other suitable information storage device or a combination of these devices. A memory may include any suitable information for use in the operation of component of system 100. A memory may further include some or all of one or more databases.

Logic may perform the operation of any component of system 100, for example, logic executes instructions to generate output from input. Logic may include hardware, software, and/or other logic. Logic may be encoded in one or more non-transitory, tangible media, such as a computer-readable medium or any other suitable tangible medium, and may perform operations when executed by a computer and/or processor. Certain logic, such as a processor, may manage the operation of a component.

Figure 2A:
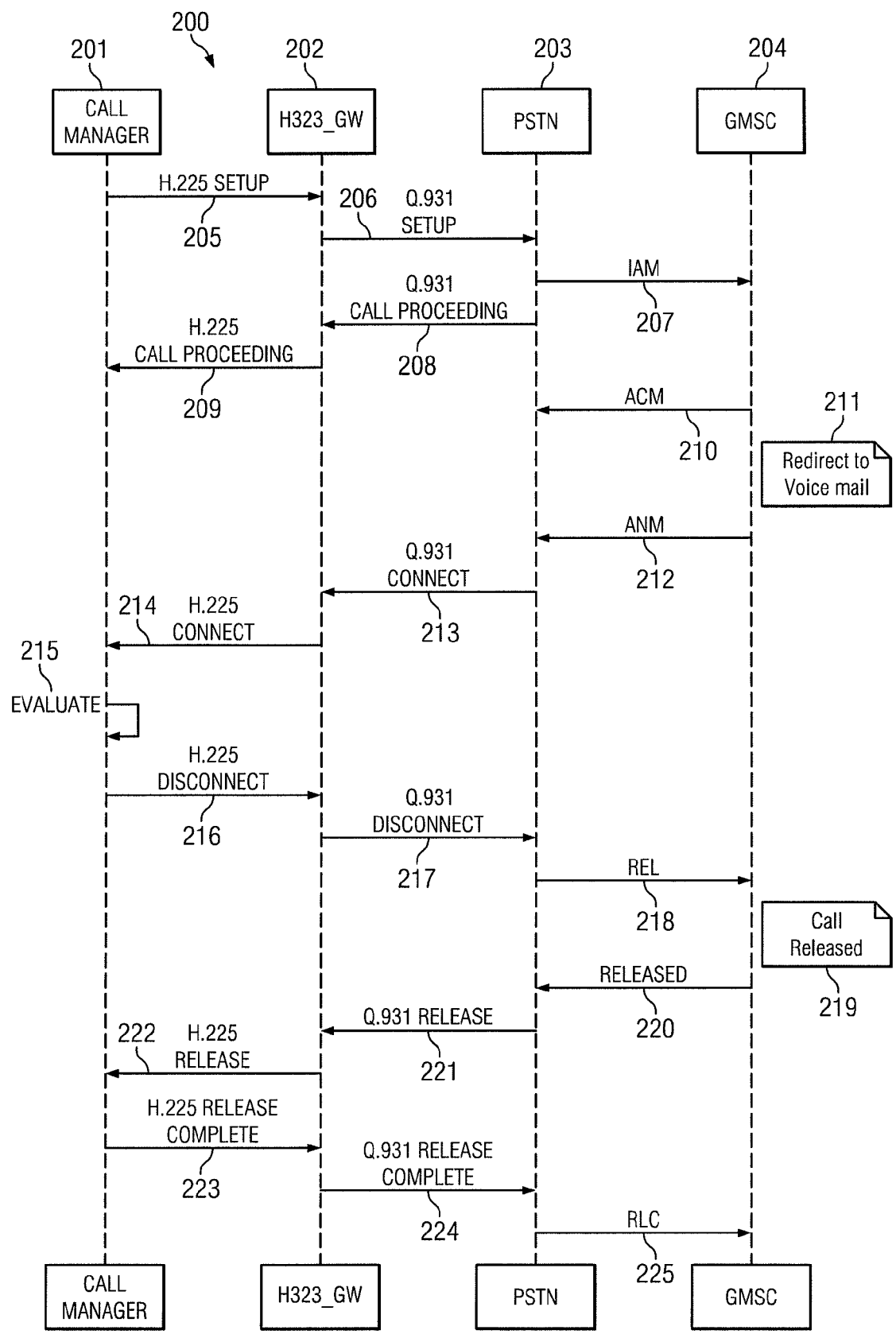
FIG. 2A illustrates an example call flow that includes an H.323 gateway for terminating a call according to reverse signaling data for the call.

FIG. 2A illustrates an example call flow 200 that includes an H.323 gateway for terminating a call according to reverse signaling data for the call. In the illustrated embodiment, call flow 200 involves call manager 201, H.323 gateway 202, PSTN 203, and GMSC 204. In certain embodiments, call manager 201 communicates with H.323 gateway 202 using H.323 (comprising H.225 call signaling protocol and H.245 control protocol for multimedia communications), H.323 gateway 202 communicates with PSTN 203 using Q.931 protocol, and PSTN 203 communicates with GMSC 204 using SS7 protocol. Any component may use any suitable protocol or protocols to communicate with any other component.

In the illustrated embodiment, call flow 200 begins when call manager 201 initiates a call to a mobile endpoint 110a and communicates setup message 205 to H.323 gateway 202 to setup the call to mobile endpoint 110a. H.225 setup message 205 includes the number of the called mobile endpoint 110a. H.323 gateway 202 receives H.225 setup message 205 from call manager 201, and communicates Q.931 setup message 206 to PSTN 203 indicating that a call to mobile endpoint 110a needs to be established. PSTN 203 receives Q.931 setup message 206, and communicates initial address message (IAM) 207 to GMSC 204 indicating that a call to mobile endpoint 110a needs to be established. PSTN 203 communicates Q.931 call proceeding message 208 to H.323 gateway 202 indicating that the call to mobile endpoint 110a is being processed. H.323 gateway 202 receives Q.931 call proceeding message 208, and communicates H.225 call proceeding message 209 to call manager 201 indicating the processing of the call to mobile endpoint 110a. GMSC 204 receives IAM 207, and communicates address complete message (ACM) 210 to PSTN 203 indicating that the call is connecting to mobile endpoint 110a.

The call to mobile endpoint 110a redirects to a voice mail system at 211. GMSC 204 communicates answer message (ANM) 212 to PSTN 203, which indicates that the call is connecting. In the illustrated embodiment, ANM 212 contains a redirection number information element (RNIE) which includes a redirection number. Because the call is redirected to a voice mail system, the redirection number contained in RNIE is the number of the voice mail system. A RNIE is generally not communicated if a call redirection has not occurred.

PSTN 203 receives ANM 212, and communicates Q.931 connect message 213 to H.323 gateway 202 indicating that the call is being connected. Q.931 connect message 213 includes the RNIE from ANM message 212. H.323 gateway 202 receives Q.931 connect message 213, and communicates H.225 connect message 214 to call manager 201 indicating that the call is being connected. H.225 connect message 214 includes the RNIE from ANM message 212.

Call manager 201 compares the number in the RNIE from H.225 connect message 214 to the called number from setup message 205 at 215. In certain embodiments, if the RNIE includes the number of mobile endpoint 110a from setup message 205, a number designated by a user as an approved call forwarding number, or if a redirection number is not present in H.225 connect message 214, call manager 201 does not release the call and allows the call to connect to the endpoint 110 associated with the redirection number. In an embodiment, in all other cases (e.g., the RNIE contains a number other than the number of mobile endpoint 110a from setup message 205 or a user designated call forwarding number), call manager 201 releases the call and the call does not connect to the endpoint 110 associated with the redirection number (e.g., a voice mail system).

In the illustrated embodiment, call manager 201 determines from the RNIE in H.225 connect message 214 that the call should be released. Call manager 201 communicates H.225 disconnect message 216 to H.323 gateway 202 indicating that the call should be released. H.323 gateway 202 receives H.225 disconnect message 216, and communicates Q.931 disconnect message 217 to PSTN 203 indicating a request to release the call to mobile endpoint 110a. PSTN 203 receives Q.931 disconnect message 217, and communicates release (REL) message 218 to GMSC 204 to release the call.

The call to mobile endpoint 110a, which was establishing a connection to a voice mail system, is released at 219. GMSC 204 communicates released message 220 to PSTN 203 indicating that the call to mobile endpoint 110a is released. PSTN 203 receives released message 220, and communicates Q.931 release message 221 to H.323 gateway 202 indicating that the call to mobile endpoint 110a is released. H.323 gateway 202 receives Q.931 release message 221, and communicates release message 222 to call manager 201 indicating that the call to mobile endpoint 110a is released. Call manager 201 receives release message 222, and communicates release complete message 223 to H.323 gateway 202 acknowledging that the call to mobile endpoint 110a has disconnected. H.323 gateway 202 receives release complete message 223, and communicates Q.931 release complete message 224 to PSTN 203 acknowledging that the call to mobile endpoint 110a has released. PSTN 203 receives Q.931 release complete message 224, and communicates release complete (RLC) message 225 to GMSC 204 acknowledging that the call to mobile endpoint 110a has released. Call flow 200 ends after 225.

Figure 2B:
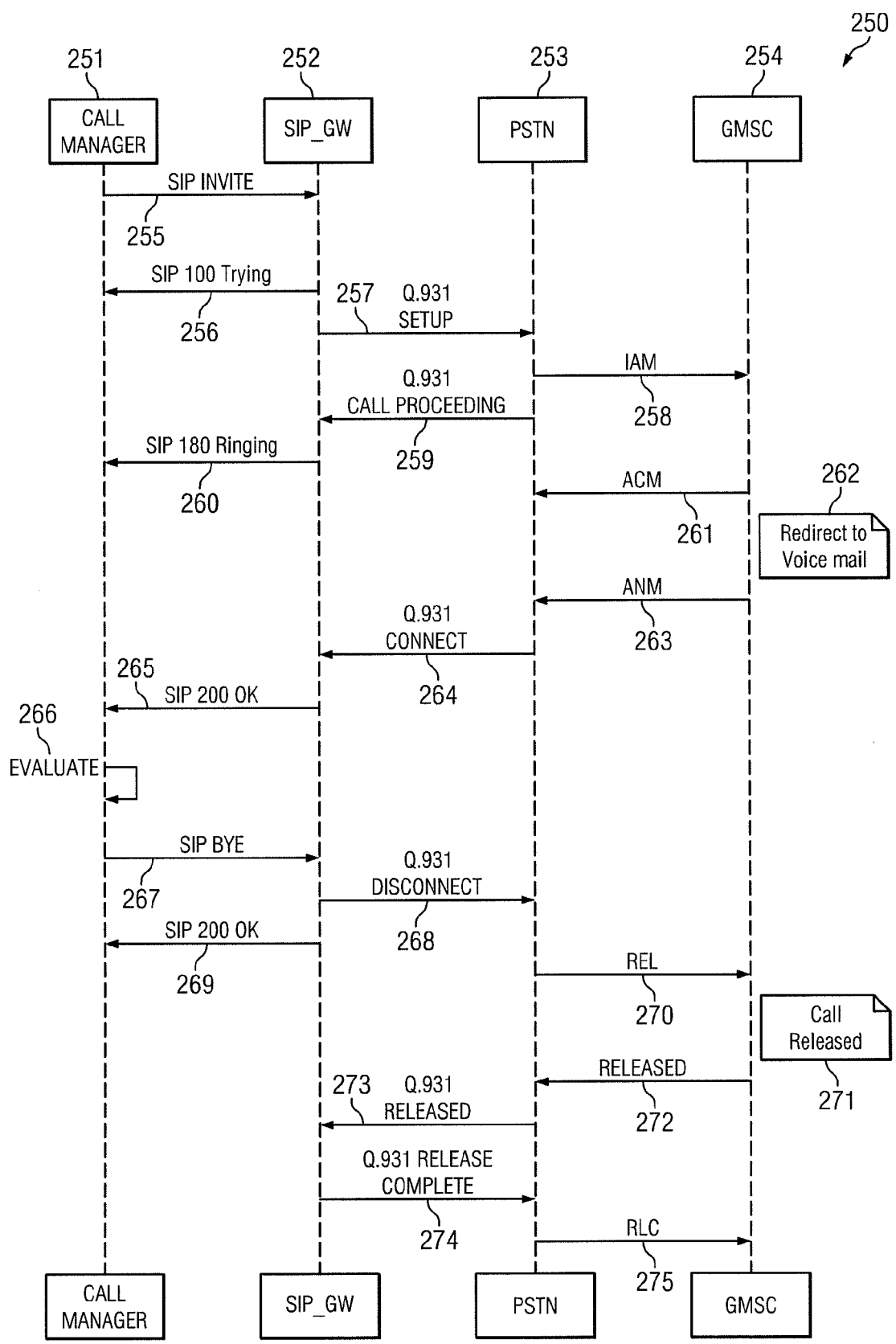
FIG. 2B illustrates an example call flow that includes a session initiation protocol (SIP) gateway for terminating a call according to reverse signaling data for the call.

FIG. 2B illustrates an example call flow 250 that includes a SIP gateway for terminating a call according to reverse signaling data for the call. In the illustrated embodiment, call flow 250 involves call manager 251, SIP gateway 252, PSTN 253, and GMSC 254. In certain embodiments, call manager 251 communicates with SIP gateway 252 using SIP, SIP gateway 252 communicates with PSTN 253 using Q.931 protocol, and PSTN 253 communicates with GMSC 204 using SS7 protocol. Any component may use any suitable protocol or protocols to communicate with any other component.

Call flow 250 begins when call manager 251 initiates a call to a mobile endpoint 110a and communicates SIP invite message 255 to SIP gateway 252 to setup the call to mobile endpoint 110a. SIP invite message 255 includes the number of the called mobile endpoint 110a. SIP gateway 252 receives SIP invite message 255, and communicates SIP 100 trying message 256 to call manager 251 indicating that SIP invite message 255 has been received by SIP gateway 252. SIP gateway 252 communicates Q.931 setup message 257 to PSTN 253 indicating that a call to mobile endpoint 110a needs to be established. PSTN 253 receives Q.931 setup message 257, and communicates IAM 258 to GMSC 254 indicating that a call to mobile endpoint 110a needs to be established. PSTN 203 communicates Q.931 call proceeding message 259 to SIP gateway 252 indicating that the call to mobile endpoint 110a is being processed. SIP gateway 252 receives Q.931 call proceeding message 259, and communicates SIP 180 ringing message 260 indicating that the call to mobile endpoint 110a is being processed. GMSC 254 communicates ACM message 261 to PSTN 253 indicating that the call is connecting to mobile endpoint 110a.

The call to mobile endpoint 110a redirects to a voice mail system at 262. GMSC 254 communicates ANM 263 to PSTN 253 indicating that the call is connecting. ANM 263 contains RNIE. Because the call redirected to a voice mail system, the redirection number contained in RNIE is the number of the voice mail system. A RNIE is generally not communicated if a call redirection has not occurred.

PSTN 253 receives ANM 263, and communicates Q.931 connect message 264 to H.323 gateway 252 indicating that the call is being connected. Q.931 connect message 264 includes the RNIE from ANM message 263. SIP gateway 252 receives Q.931 connect message 264, and communicates SIP 200 OK message 265 to call manager 251 indicating that the call is being connected. SIP 200 OK message 265 includes a SIP component (e.g., a history-info header or a diversion header), which is mapped from the RNIE from Q.931 connect message 264 and includes the redirection number contained in the RNIE.

At 266, call manager 251 compares the redirection number in the history-info header or diversion header from SIP 200 OK message 265 to the number from SIP invite message 255. In certain embodiments, if the history-info header includes the number of mobile endpoint 110a from SIP invite message 255, a number designated by a user as a call forwarding number, or if SIP 200 OK message 265 does not contain a history-info header mapped from the RNIE in Q.931 connect message 264, call manager 251 does not release the call and allows the call to connect to the endpoint 110 associated with the redirection number. In all other cases (e.g., the history-info header or diversion header contains a number other than the number of mobile endpoint 110a from SIP invite message 255 or a user designated call forwarding number), call manager 251 releases the call and the call does not connect to the endpoint 110 associated with the redirection number.

In the illustrated embodiment, call manager 251 determines from the number in the history-info header or diversion header from SIP 200 OK message 265 that the call to mobile endpoint 110a should be released. Call manager 251 communicates SIP BYE message 267 to SIP gateway 252 to release the call. SIP gateway 252 receives SIP BYE message 267, and communicates. Q.931 disconnect message 268 to PSTN 253 indicating a request to release the call to mobile endpoint 110a. SIP gateway 252 communicates SIP 200 OK message 269 indicating that the call to mobile endpoint 110c is being released. PSTN 253 receives Q.931 disconnect message 268, and communicates release (REL) message 270 to GMSC 254 to release the call to mobile endpoint 110a.

The call to mobile endpoint 110a, which was establishing a connection to a voice mail system, releases at 271. GMSC 204 communicates released message 272 to PSTN 253 indicating that the call to mobile endpoint 110a is released. PSTN 253 receives released message 272, and communicates Q.931 release message 273 to SIP gateway 252 indicating that the call to mobile endpoint 110a is released. SIP gateway 252 receives Q.931 release message 273, and communicates release complete message 274 to PSTN 253 acknowledging that the call to mobile endpoint 110a has released. PSTN 253 receives Q.931 release complete message 274, and communicates release complete (RLC) message 275 to GMSC 254 acknowledging that the call to mobile endpoint 110a has released. Call flow 250 ends after 275.

Modifications, additions, or omissions may be made to the call flows 200 and 250. Call flows 200 and 250 may include more, fewer, or other messages. Call flows 200 and 250 may include more, fewer, or other components of system 100. Call flows 200 and 250 may involve a call to a public switched endpoint 110b, and may not involve GMSC 120. Call flows 200 and 250 may involve a call to a private network endpoint 110 and may not involve PSTN 130 or GMSC 120. Call flows 200 and 250 may utilize any suitable protocol, or number of protocols, for relaying reverse signaling data identifying a redirection number from an endpoint 110 redirecting a call to call manager 150. Any suitable message may relay a call redirection number for endpoint 110 to call manager 150.

Figure 3:
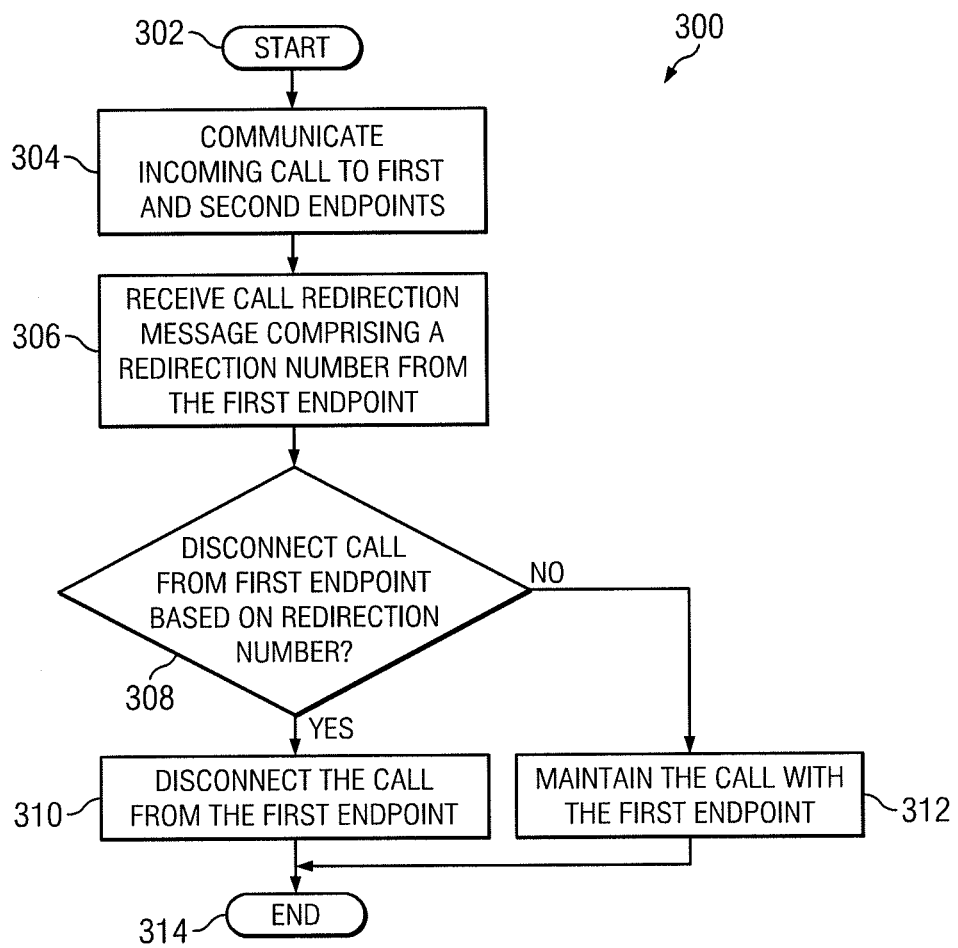
FIG. 3 is a flow chart that illustrates an example method for terminating a call according to reverse signaling data for the call.

FIG. 3 is a flow chart that illustrates an example method 300 for terminating a call according to reverse signaling data for the call. Method 300 begins at step 302. At step 304, call manager 150 communicates a call to a first endpoint 110a and a second endpoint 110c. At step 306, call manager 150 receives a call redirection message comprising an redirection number from the first endpoint 110a. At step 308, call manager 150 determines whether to release the call to the first endpoint 110 according to the redirection number.

For example, if the redirection number includes the number of the first endpoint 110a, a number designated by a user as an approved call redirection number, call manager 150 maintains the call with the first endpoint 110a. As another example, if the redirection number is not present in the reverse signaling data, call manager 150 maintains the call with the first endpoint 110a. In other examples (e.g., the redirection number is a number other than the first endpoint or a user designated call forwarding number), call manager 150 releases the call to the first endpoint 110a.

If call manager 150 determines from the redirection number that the call to the first endpoint 110a should be released, the method moves to step 310 and call manager 150 releases the first endpoint 110a from the call and the method ends at step 314. If call manger 150 determines from the redirection number that the call to the first endpoint 110a should not be released, the method moves to step 312 and call manager 150 maintains the first endpoint on the call and the method ends at step 314.

Modifications, additions, or omissions may be made to method 300. Method 300 may include more, fewer, or other steps. The steps of method 300 may be performed in any suitable order, and may be performed by any suitable component of system 100.

Certain embodiments of the present disclosure may provide one or more technical advantages. In an embodiment, system 100 determines that a call to endpoint 110a is redirected to a voice mail system, and disconnects the call before a voice mailbox associated with endpoint 110a stores a voice message for the call. In another embodiment, system 100 prevents voice messages for calls associated with an enterprise from being stored in a voice mailbox associated with an endpoint 110 outside the enterprise without user input during the call. In another embodiment, system 100 is able to distinguish between a call redirecting to a voice mail system and a call redirecting to an approved redirection number (e.g., a call forwarding number). In another embodiment, system 100 determines that a call to endpoints 110a, 110b, and 110c is redirected to a voice mail system by endpoint 110a, and disconnects the call to endpoint 110a while the call continues to ring at endpoints 110b and 110c.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method, comprising:
    communicating an incoming call to a first endpoint and a second endpoint concurrently, the first and second endpoints associated with a user, wherein a voice mailbox associated with the second endpoint is associated with an enterprise and a voice mailbox associated with the first endpoint is not associated with the enterprise;
    receiving a call redirection message comprising a redirection number from the first endpoint indicating that the call to the first endpoint is being redirected to a voice mail system;
    determining whether the first endpoint should be disconnected from the call according to the redirection number; and
    disconnecting the call from the first endpoint if the redirection number does not contain one from the set of:
        a telephone number associated with the first endpoint; and
        a telephone number from a plurality of approved numbers.

2. The method of claim 1, wherein the redirection number is communicated using at least one from the set comprising: an ISDN User Part (ISUP) message, a ISDN Q.931 message, a session initiation protocol (SIP) message, a H.225 message, a media gateway control protocol (MGCP) message, and a skinny call control protocol (SCCP) message.

3. A non-transitory computer readable medium comprising logic, the logic, when executed by a processor, operable to:
    communicate an incoming call to a first endpoint and a second endpoint concurrently, the first and second endpoints associated with a user, wherein a voice mailbox associated with the second endpoint is associated with an enterprise and a voice mailbox associated with the first endpoint is not associated with the enterprise;
    receive a call redirection message comprising a redirection number from the first endpoint indicating that the call to the first endpoint is being redirected to a voice mail system;
    determine whether the first endpoint should be disconnected from the call according to the redirection number; and
    disconnect the call from the first endpoint if the redirection number does not contain one from the set of:
        a telephone number associated with the first endpoint; and
        a telephone number from a plurality of approved numbers.

4. The computer readable medium of claim 3, wherein the redirection number is communicated using at least one from the set comprising: an ISDN User Part (ISUP) message, a ISDN Q.931 message, a session initiation protocol (SIP) message, a H.225 message, a media gateway control protocol (MGCP) message, and a skinny call control protocol (SCCP) message.

5. A system, comprising:
    an interface operable to:
        communicate an incoming call to a first endpoint and a second endpoint concurrently, the first and second endpoints associated with a user, wherein a voice mailbox associated with the second endpoint is associated with an enterprise and a voice mailbox associated with the first endpoint is not associated with the enterprise; and
        receive a call redirection message comprising a redirection number from the first endpoint indicating that the call to the first endpoint is being redirected to a voice mail system; and
    a processor communicatively coupled to the interface and the processor operable to:
        determine whether the first endpoint should be disconnected from the call according to the redirection number, wherein the interface disconnects the call from the first endpoint if the redirection number does not contain one from the set of:
            a telephone number associated with the first endpoint; and
            a telephone number from a plurality of approved numbers.

6. The system of claim 5, wherein the redirection number is communicated using at least one from the set comprising: an ISDN User Part (ISUP) message, a ISDN Q.931 message, a session initiation protocol (SIP) message, a H.225 message, a media gateway control protocol (MGCP) message, and a skinny call control protocol (SCCP) message.

* * * * *